United States Patent [19]

Apostolos et al.

[11] Patent Number: 4,654,667
[45] Date of Patent: Mar. 31, 1987

[54] SIGNAL-ACQUISITION SYSTEM FOR A CIRCULAR ARRAY

[75] Inventors: John T. Apostolos, Merrimack; Robert H. Carrier, Durham, both of N.H.

[73] Assignee: Sanders Associates, Inc., Nashua, N.H.

[21] Appl. No.: 685,175

[22] Filed: Dec. 21, 1984

[51] Int. Cl.⁴ .......................... G01S 5/04; G01S 3/16; G06G 7/19
[52] U.S. Cl. .................................... 342/445; 342/378; 342/22; 364/827; 364/516; 364/726; 324/77 B
[58] Field of Search ...................... 343/5 FT, 378, 417, 343/443, 445; 324/77 B; 364/516, 725, 726, 827

[56] References Cited

U.S. PATENT DOCUMENTS

| | | |
|---|---|---|
| 4,035,804 | 7/1977 | Overbury . |
| 4,084,148 | 4/1978 | Koshikawa . |
| 4,166,980 | 9/1979 | Apostolos et al. . |
| 4,180,814 | 12/1979 | Barton . |
| 4,244,037 | 1/1981 | Jelks . |
| 4,254,417 | 3/1981 | Speiser . |
| 4,305,159 | 12/1981 | Stromswold et al. . |
| 4,332,016 | 5/1982 | Berntsen . |

Primary Examiner—Theodore M. Blum
Assistant Examiner—Gregory C. Issing
Attorney, Agent, or Firm—Louis Etlinger; Stanton D. Weinstein; William F. Porter, Jr.

[57] ABSTRACT

A signal-acquisition system (10) for a circular antenna array (12) includes a two-dimensional compressive receiver (18) that performs a two-dimensional Fourier transformation in time and position on the outputs of the array. Each of the outputs of the compressive receiver (18) is fed to input ports of several processing units (24), which multiply them by an appropriate time-dependent function. The resultant modified signals are then processed by Butler matrices (30) that together have a matrix of output ports (32). Each output port is associated with a different combination of azimuth and elevation angles. A signal source at given azimuth and elevation angles with respect to the array (12) causes its greatest response in the output port (32) associated with those angles.

7 Claims, 3 Drawing Figures

SIGNAL-ACQUISITION SYSTEM FOR A CIRCULAR ARRAY

BACKGROUND OF THE INVENTION

The present invention is directed to signal-acquisition systems. It is concerned specifically with a system for processing the output of a circular array of antenna elements so as to determine both the azimuth and the elevation angles of the source of signals that the antenna array receives.

U.S. patent application Ser. No. 551,664, filed on Nov. 14, 1983, by Apostolos, Boland, and Stromswold for an ACQUISITION SYSTEM EMPLOYING CIRCULAR ARRAY, discloses a powerful system for determining the directions of arrival and frequencies of many signals simultaneously. An improvement in that system is disclosed in U.S. patent application Ser. No. 536,477, filed on Sept. 28, 1983, by John T. Apostolos for a TWO-DIMENSIONAL ACQUISITION SYSTEM USING CIRCULAR ARRAY. In both of these systems, a spatial Fourier transformation is performed on the outputs of a circular antenna array. The resultant transform is processed with certain correction factors related to the antenna pattern of the array and then subjected again to a spatial Fourier transformation. A temporal Fourier transformation is also performed. The result of each system is an ensemble of signals at a group of output ports in which each output port represents a different azimuthal direction. Signals from a source in a given azimuthal direction result in a maximum output at the port associated with that azimuthal direction. Thus, the azimuthal direction of each source is readily identified in real time. The descriptions included in these patent applications are helpful in understanding the present invention, and they are accordingly incorporated by reference.

The assumption on which the design of the systems of those two applications is based is that the source has a negligible elevation angle. That is, there is only a very small angle between the direction of arrival of the signal and the plane of the circular antenna array. For a wide range of applications, this is an accurate assumption. For sources whose angle of elevation is significant, however, the direction indications produced by the systems of those two applications are inaccurate.

An object of the present invention is to eliminate the inaccuracies that can be caused in such systems by significant elevation angles.

It is a further object of the present invention to determine the values of the elevation angles of signal sources.

SUMMARY OF THE INVENTION

The foregoing and related objects are achieved in the method described below and in apparatus for carrying out that method. The method includes performing a spatial Fourier transformation on an ensemble of input signals from a circular antenna array to generate an ensemble of input-transform signals, each of which is associated with a separate integer index n. A signal associated with an index n represents the spatial-frequency component of n electrical degrees per spatial degree around the circular antenna array and consists of components representing all of the antenna-signal temporal-frequency components that give rise to that spatial frequency. According to the invention, an ensemble of modified-transform signals is generated from these input signals for each of a plurality of elevation angles. Each ensemble includes a modified-transform signal associated with each input-transform signal. Each modified-transform signal consists of modified-transform components, each of which represents a value that is substantially proportional to an associated component in the input-transform signal multiplied by $(-1)n$ times the azimuth-independent factor in the antenna pattern that would be generated by the antenna array at the associated elevation angle if the antenna array were driven by signals whose temporal frequency is the frequency with which that input-transform component is associated and whose phases vary with element position at the spatial frequency represented by that input-transform signal.

A spatial Fourier transformation is performed on each ensemble of modified-transform signals to generate an ensemble of output-transform signals for each of the plurality of elevation angles. Within a given output-transform ensemble, each output-transform signal is associated with a different azimuth angle. The result of this process is that radiation emitted by a source and received by the antenna array causes a maximum response in the output-transform signal associated with the azimuth and elevation angles of that source.

BRIEF DESCRIPTION OF THE DRAWINGS

These and further features and advantages of the present invention are described in connection with the accompanying drawings, in which.

DETAILED DESCRIPTION OF THE PREFERRED EMBODIMENTS

Figure 1:
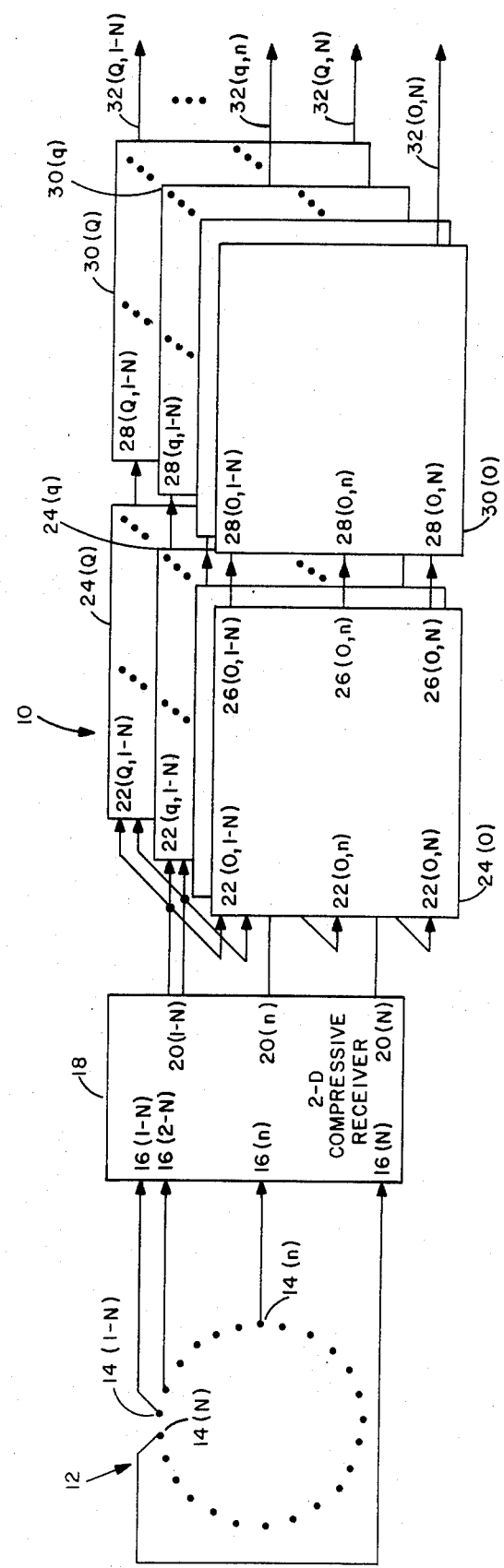
FIG. 1 is a block diagram of the system of the present invention for determining the elevation and azimuthal position of the source of signals detected by a circular array of antenna elements.

The invention will be described initially by simultaneous reference to FIGS. 1, and 2. The system 10 of the present invention is a device for determining the angle of elevation, the azimuth angles, and the temporal frequencies of radiation received from a plurality of sources by a circular antenna array 12 of 2N elements 14(1−N) through 14(N). The outputs of the antenna elements 14 are fed to corresponding input ports 16 of a two-dimensional compressive receiver 18. In essence, the two-dimensional compressive receiver performs a two-dimensional Fourier transformation on the signal ensemble that it receives at its input ports. The transformation is from time to temporal frequency and from position to spatial frequency. The compressive receiver 18 has 2N output ports, each of which is associated with a spatial-frequency component, and a spatial-frequency component in the input ensemble causes its greatest response at the output port 20(n) associated with that spatial-frequency component.

Spatial frequency in this context refers to the instantaneous phase advance around the elements of the circular array. For instance, suppose that the signals on all of the elements 14 of the circular array 12 are sinusoidal signals of the same temporal frequency but having different phases. Suppose further that these phases advance with element position by n electrical degrees per spatial degree, where n is an integer. In such a situation, the array output has a single temporal-frequency component and a single spatial-frequency component. For such an ensemble of signals, the output of the compressive receiver 18 is a burst of oscillatory signal whose frequency is the center frequency of the compressive receiver. This output is greatest on the output port 20(n) associated with the spatial frequency of n electrical degrees per spatial degree. The compressive receiver is repeatedly swept in frequency, and the burst occurs at a time within the sweep that is determined by the temporal frequency of the radiation that causes the signal ensemble. For the ensemble just described, the response at any of the other output ports 20 is negligible—because there are no other spatial-frequency components—and a significant output on output port 20(n) occurs only at the time within the sweep associated with the temporal frequency of the radiation.

Of course, this signal ensemble, which has only one spatial-frequency component, is extremely artificial; even a single plane-wave signal at a single temporal frequency gives rise to many spatial-frequency components in a circular array. In ordinary operation, many spatial-frequency components, and usually many temporal-frequency components, are present in the ensemble of signals processed by the two-dimensional compressive receiver 18, which processes all of these components simultaneously.

Those skilled in the art will recognize that the two-dimensional compressive receiver includes a two-dimensional dispersive delay line and that the position of an output port on the output edge of the delay line determines the spatial-frequency component with which that output port 20 is associated. Therefore, the output ports of compressive recievers can in general be positioned so as to be associated with other than integral numbers of electrical degrees per spatial degree. However, compressive receiver 18 is arranged so that the spatial frequencies associated with the output ports 20 are integral; as was stated before, each output port 20(n) is associated with a spatial frequency of n electrical degrees per spatial degree.

The signal from each compressive-receiver output port 20(n) is fed to a corresponding input port on each of Q+1 different processing units 24(∅)–24(Q). These processing units 24 multiply the input signals by processing factors that are functions of time within the compressive-receiver sweep and depend on the particular input port 22(q,n) to which the signal is applied. The signal resulting from multiplication of the signal on each input port 22(q,n) is presented on a corresponding output port 26(q,n) to a corresponding input port 28(q,n) of one of Q+1 modified Butler matrices 30(∅)–30(Q). Each modified Butler matrix 30(q) performs a spatial Fourier transformation but no temporal Fourier transformation.

The Butler matrix 30(q) is a modified version of a conventional Butler matrix of the type described in U.S. Pat. No. 3,255,450, which issued on June 7, 1966, to Jesse L. Butler for a Multiple Beam Antenna System Employing Multiple Directional Couplers in the Leadin. In the conventional Butler matrix, the two adjacent central output ports represent opposite phase gradients, or spatial frequencies, of the same magnitude, and the other output ports represent spatial frequencies that are odd harmonics of these spatial frequencies. For example, with N=4, the outputs of a conventional Butler matrix would correspond to spatial frequencies of ±22 ½, ±67 ½, +112 ½, and ±157 ½ electrical degrees per input port. In the modified Butler matrix 30(q), the spatial-frequency difference between any two adjacent output ports is the same as that for a conventional Butler matrix. However, the spatial frequencies represented by the output ports 32(q,n) of the modified Butler matrix 30(q) differ from those of a conventional Butler maxtrix by one-half of that spatial-frequency difference. For N=4, therefore, the output ports 32(q) correspond to spatial frequencies of 0, ±45, ±90, ±135, and 180 electrical degrees per input port.

The modified Butler matrix can be constructed in a number of ways. The most straightforward conceptually is to provide phase shifters (not shown in the drawings) at the input ports of a conventional Butler matrix. Each of the phase shifters provides a different phase shift, the phase shifts increasing with input-port position in such a manner that the phase shifts of adjacent phase shifters differ by one-half the spatial-frequency spacing of the output ports 32.

The ultimate result of the system is that each output port 32(q,n) is associated with an elevation angle of $90° \times q/Q$ and an azimuth angle of $180° \times n/N$. A plane wave that arrives at the antenna array 12 at a given combination of azimuth angle and elevation angle causes the greatest response on the output port associated with that combination of angles, and the time within a compressive-receiver sweep at which the response occurs is an indication of the temporal frequency of the plane wave.

Figure 2:
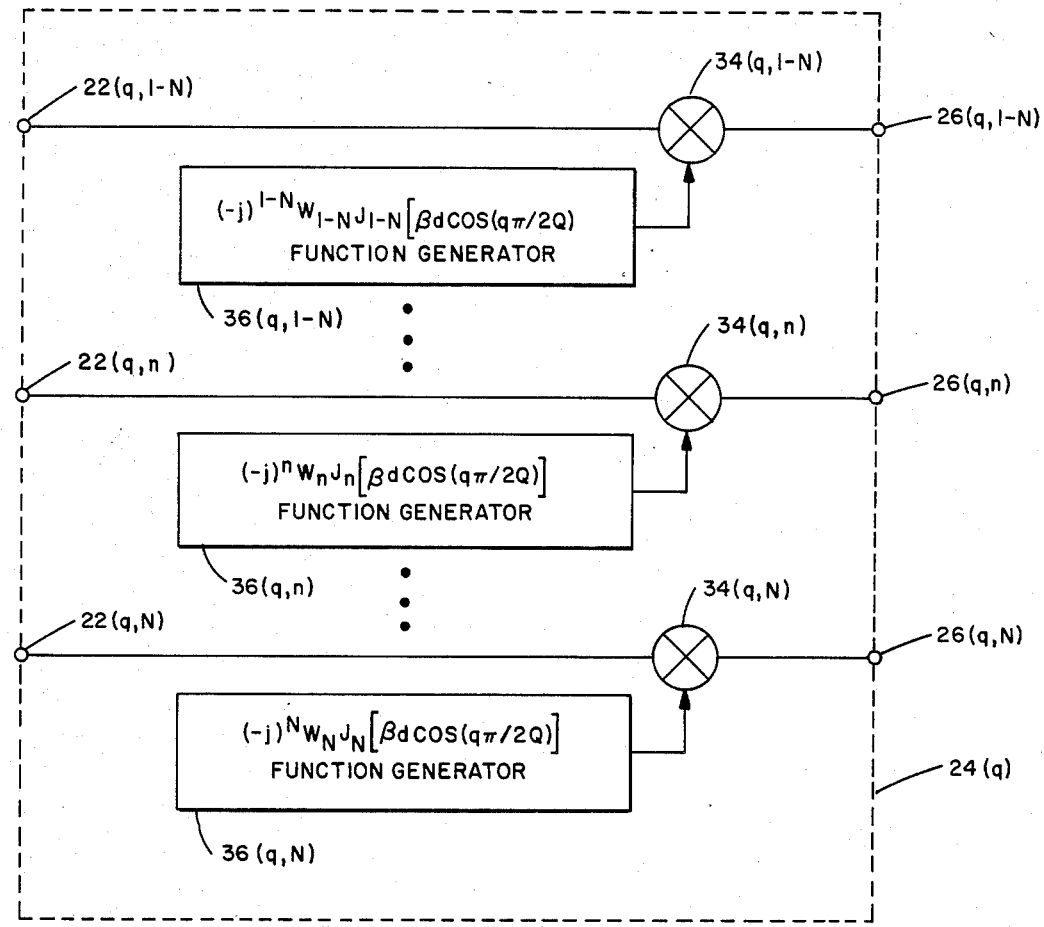
FIG. 2 is a more-detailed block diagram of a portion of the system of FIG. 1.

FIG. 2 shows one of the processing units 24(q) of FIG. 1 in more detail. Associated with each input port 22(q,n) and output port 26(q,n) is an analog multiplier 34(q,n) which multiplies the signal from the input port 22(q,n) by a processing factor represented by a signal that a function generator 36(q,n) produces. The value of the processing factor is shown in FIG. 2, where $J_n$ is the nth-order Bessel function of the first kind. The $W_n$'s are weighting factors that would be used in most practical applications to improve the dynamic range of the system output, as will be described in more detail below. The weighting factors are constants that differ for different function generators within a processor unit 24 but are the same for corresponding function generators in different processor units.

The processing factors depend on q, n, and the wave number B. The wave number, in turn, is proportional to the antenna-signal temporal-frequency component to which the compressive receiver is responding at the current point in the compressive-receiver sweep; that is, the processing factors are functions of time within a sweep. The processing factor produced by function generator 36(q,n), if a factor of $2\pi$ is ignored, is the weighting factor multiplied by $(-1)^n$ times a quantity that, as will shortly be explained, can be described as the azimuth-independent factor in a particular antenna pattern. This antenna pattern is one that is generated by an appropriate phasing of the circular array 12. Specifically, if the antenna elements were used for transmission and driven at the temporal frequency corresponding to B but at different phases so that the phases advance around the array at a spatial frequency of n electrical degrees per spatial degree, then the far-field antenna pattern associated with processing unit 24(q) is:

$$2\pi j h u \, n e^{jn\phi} J_n[\beta d \cos(q\pi/2Q)]$$

This is the antenna pattern mentioned above. The only azimuth-dependent factor in this pattern is is $e^{jn\phi}$. The remaining factors of this pattern—i.e., the azimuth-independent factor—is included in the processing factor in the manner just described.

The function generator typically includes a read-only digital memory containing values of the processing factor, which, for any individual function generator $36(q,n)$, is a function of radiation temporal frequency only. Since the frequency to which a compressive-receiver output is responding at any given time is a function of the time during the compressive-receiver sweep, the function generator is synchronized with the sweep to achieve the correct timing.

The function generator typically also includes a digital-to-analog converter to which the outputs of the read-only memory are fed. The outputs of the digital-to-analog converter are applied to the analog multiplier $34(q,n)$. The functions depicted in FIG. 2 are all either purely real or purely imaginary. Therefore, although the multipliers $34(q,n)$ perform complex multiplications, they can be provided as simple doubly balanced modulators with or without 90° phase shifts; there is no need to include a device for adding phase and quadrature components.

The broader teachings of the present invention can be practiced without the temporal Fourier transformation that the compressive receiver 18 performs. That is, the compressive receiver 18 could, in principle, be replaced with a modified Butler matrix or similar device. In such a system, the processing unit $24(q)$ would receive the results of antenna signals of all received temporal frequencies simultaneously. Accordingly, the multiplier and function generator of FIG. 2 would be replaced with a filter network for performing the functions depicted in FIG. 2. Although synthesis of a network implementing one of the functions of FIG. 2 does not appear to be straightforward, a close approximation can readily be achieved in a filter having a reasonable number of poles by employing available network-synthesis routines.

Figure 3:
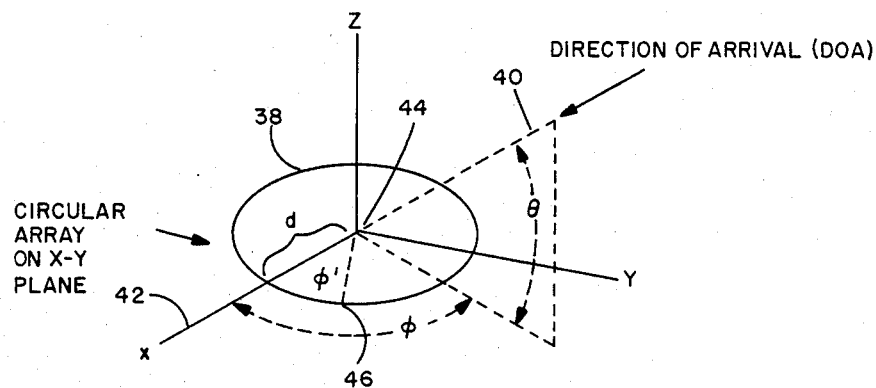
FIG. 3 is a diagram used to define variables employed in the mathematical treatment of the invention.

We now turn to a mathematical treatment of the operation of the invention. This treatment will proceed with the aid of FIG. 3, which includes a circle 38 that represents a continuous linear array that the discrete array 12 approximates. A plane wave propagates along a direction of arrival 40 at an angle of elevation $\theta$ and an azimuth angle $\Phi$ with respect to an arbitrary azimuth reference 42. To determine the phase, relative to the center 44 of the array, of the signal at a given element position 46 whose azimuth angle is $\Phi'$, one determines the perpendicular distance between the element 46 and a plane normal to the direction of arrival 40 through the center 44. If the radius of the circular array is d, then the perpendicular distance is given by $d \cos(\Phi'-\Phi)\cos\theta$. Therefore, the phasor representation of the signal at a position $\Phi'$ is given by:

$$E(\Phi') = e^{j\beta d\cos(\Phi'-101)\cos\theta} \quad (1)$$

It will be recalled that the compressive receiver 18 generates an output ensemble at any given time that represents a spatial Fourier transformation of the input-signal components in its input ensemble having the temporal frequency associated with that particular time in the compressive-receiver sweep. Accordingly, at a time associated with the frequency for which the wave number is equal to B, the signal at a compressive-receiver output port $20(n)$ is represented by the spatial Fourier coefficient with which it is associated:

$$c_n = \int_{-\pi}^{\pi} e^{jn\phi'} E(\phi') d\phi' \quad (2)$$

Substitution of equation (1) into equation (2) yields the following expression for the nth Fourier coefficient $c_n$:

$$c_n = \int_{-\pi}^{\pi} e^{jn\phi'} e^{j\beta d\cos(\phi'-\phi)\cos\theta} d\phi \quad (3)$$

Evaluation of the integral in equation (3) can be performed with the aid of Hansen's integral formula for an nth-order Bessel function of the first kind:

$$J_n(z) = \frac{1}{2\pi} \int_{-\pi}^{\pi} e^{jz\cos t} e^{jn(t-\pi/2)} dt \quad (4)$$

This results in the following expression for the signal at output port $20(n)$:

$$C_n = 2\pi j^n e^{jn\Phi} J_n(\beta d \cos\theta) \quad (5)$$

Inspection of equation (5) reveals that this output signal is a function of the azimuth and elevation angles of the source and is also a function of the wave number, which is proportional to temporal frequency.

In general, the radiation may come from more than one direction, and the output $c_n$ is the sum of the signals given by equation (5) for sources at different elevation and azimuth angles. At a given time within the compressive-receiver sweep, however, the output at port $20(n)$ responds to signals of only a single frequency. Therefore, the outputs in response to antenna signals that are sufficiently separated in temporal frequency are not added, because they occur at different times.

As was stated above, each processing unit $24(q)$ multiplies each of the $c_n$'s by a different factor and provides the output to the modified Butler matrix $30(q)$, which generates a spatial Fourier transform of the signal ensemble that it receives. This output is given by the following phase shifting and summation of discrete inputs:

$$F_{q,n} = \sum_{n=1-N}^{N} c_n d_{q,n} \epsilon^{-jn\phi_n} \quad (6)$$

where $F_{q,n}$ is the signal at output port $32(q,n)$, $d_{q,n}$ is the value of the factor applied by multiplier $34(q,n)$, and $\theta_n = \pi n/N$. For present purposes, it will be assumed that the value of the weighting factor $W_n$ is unity. In most practical embodiments, $W_n$ will differ from unity, but the assumption of a unity value will simplify the discussion, and the effect of the weighting factors will be considered at the conclusion of the mathematical development.

If $W_n = 1$, the value of $d_{q,n}$ is given by the following expression $$d_{q,n} = (-j)^n J_n(\beta d \cos\theta_q) \quad (7)$$

where $\theta_q = q\pi/2Q$.

Substitution of equation (5) and equation (7) into equation (6) yields the following expression for the signal on Butler-matrix output port $32(q,n)$:

$$F_{q,n} = \sum_{n=1-N}^{N} 2\pi J_n(\beta d\cos\theta_q)J_n(\beta d\cos\theta)e^{jn(\phi-\phi_n)} \quad (8)$$

Evaluation of this expression can be made by application of Graf's addition theorem for Bessel functions:

$$J_0(\rho) = \sum_{-\infty}^{\infty} J_n(\beta d\cos\theta_q)J_n(\beta d\cos\theta)e^{jn(\phi-\phi_n)} \quad (9)$$

where $$\rho = \beta d\sqrt{(\sin\theta\cos\phi - \sin\theta_q\cos\phi_n)^2 + (\sin\theta\sin\phi - \sin\theta_q\sin\phi_n)^2} \quad (10)$$

Comparison of equations (8) and (9) reveals that, with the exception of a factor $2\pi$, the only difference between the expressions to the right of the equals signs is that equation (8) includes only a finite number of addends. With the exception of the $2\pi$ factor, therefore, the expression in equation (8) is a good approximation for the expression of equation (9) whenever Bd is less than N, i.e., whenever the inter-element spacing is less than a wavelength. If this requirement is met, the signal on Butler-matrix output port 32(q,n) is given by the following expression:

$$F_{q,n} \cong 2\pi J_0(\beta d\sqrt{(\sin\theta\cos\phi - \sin\theta_q\cos\phi_n)^2 + (\sin\theta\sin\phi - \sin\theta_q\sin\phi_n)^2}) \quad (11)$$

The value of an output of the form set forth in equation (11) can be understood if it is recognized, first, that the zero-order Bessel function of the first kind has its overall maximum when its argument is zero and, second, that the Bessel-function argument in equation (11) goes to zero for a given output $F_{q,n}$ only when the elevation angle of the source is equal to $\theta_q$ and, at the same time, the azimuth angle of the source is equal to $\Phi_n$ therefore, each output port 32(q,n) is associated with a direction $(\theta_q,\Phi_n)$, i.e., the direction that provides the maximum response at the output port 32.

Although the overall maximum of the zero-order Bessel function occurs for an argument of zero, it has local maxima for other arguments, and it may prove desirable to "smooth" the output to reduce these local maxima. It is for this purpose that the weighting factors $W_n$ are shown in the function generators 36 of FIG. 2. The weighting factors that are best for a particular situation can be determined empirically. The resultant smoothing can increase the dynamic range of the system, although this increase in dynamic range is usually accompanied by some loss in resolution.

It is interesting to note that equation (11) is the output that one would obtain from a phased circular array aimed at $(\theta_q, \Phi_n)$ for a wave number of B. Thus, the system of the present invention is equivalent to a large number of phased circular arrays, each one phased for a different combination of direction and temporal frequency.

It will be apparent to those skilled in the art that the teachings of the present invention can be employed in systems that differ somewhat from that illustrated in the foregoing description. As was stated above, the two-dimensional compressive receiver 18 could be replaced with a modified Butler matrix. Additionally, the modified Butler matrix 30 could be replaced with a beamforming surface-acoustic-wave delay line, which, like the modified Butler matrix, performs a spatial Fourier transformation. Furthermore, equivalent devices for processing the signals digitally could be substituted: A two-dimensional fast-Fourier-transform device could be substituted for the compressive receiver 18, for example, and a plurality of one-dimensional fast-Fourier-transform devices could replace the Butler matrices. The processing units would then use digital multipliers.

Other variations of the device illustrated in the present invention will also suggest themselves to those skilled in the art in light of the foregoing disclosure.

We claim:

1. A method of determining the azimuth and elevation angles of a source of electromagnetic radiation to which a circular array of antenna elements responds by generating an ensemble of input signals, the method comprising the steps of:

A. performing a spatial Fourier transformation on the ensemble of input signals to generate an ensemble of input-transform signals, each input-transform signal being associated with a different integer index n, representing the spatial-frequency component of n electrical degrees per spatial degree, and consisting of input-transform components, each of which is generated in response to a different input-signal temporal-frequency component;

B. for each of a plurality of elevation angles, generating an ensemble of modified-transform signals associated therewith, each modified-transform signal being associated with an input-transform signal and consisting of modified-transform components, each of the modified-transform components being associated with an input-transform component and representing substantially the value of its associated input-transform signal multiplied by a processing factor equal to $(-1)^n$ times the azimuth-independent factor of the far-field antenna pattern that would be generated by the antenna array at that elevation angle if the antenna array were driven by signals whose temporal frequency is the frequency with which that input-transform component is associated and whose phases advance with element position at the spatial frequency represented by that input-transform signal;

C. for each of the plurality of elevation angles, performing a spatial Fourier transformation on the ensemble of modified-transform signals associated therewith to generate an output-transform ensemble of output-transform signals associated therewith, each output-transform signal in an output-transform ensemble also being associated with a different azimuth angle so that radiation detected by the antenna array results in a maximum in the output-transform signal associated with the azimuth and elevation angles of the radiation source.

2. A method as defined in claim 1 wherein the step of performing a spatial Fourier transformation further includes the step of performing a temporal Fourier transformation so that the input-transform signals are responses to only one temporal-frequency component at a 3. An apparatus for determining the azimuth and elevation angles of a source of electromagnetic radiation to which a circular array of antenna elements responds by generating an ensemble of input signals, the apparatus comprising:

A. a first Fourier-transform device, adapted to receive the ensemble of input signals, for performing a spatial Fourier transformation on the ensemble of input signals to generate an ensemble of input-transform signals, each input-transform signal being associated with a different integer index n, representing the spatial-frequency component of n electrical degrees per spatial degree, and consisting of input-transform components, each of which is generated in response to a different input-signal temporal-frequency component;

B. a plurality of processing units, each processing unit being associated with a different one of a plurality of elevation angles and connected to receive the input-transform ensemble and generate a modified-transform signal associated with each input-transform signal to produce a modified-transform ensemble associated with that elevation angle, each modified-transform signal consisting of modified-transform components, each of the modified-transform components being associated with an input-transform component and representing substantially the value of its associated input-transform signal multiplied by a processing factor equal to $(-1)^n$ times the azimuth-independent factor of the far-field antenna pattern that would be generated by the antenna array at that elevation angle if the antenna array were driven by signals whose temporal frequency is the frequency with which that input-transform component is associated and whose phases advance with element position at the spatial frequency represented by that input-transform signal;

C. a plurality of second Fourier-transform devices, each of which is associated with a different processing unit and thus with a different elevation angle and is connected to receive the modified-transform ensemble from its associated processing unit, for performing a spatial Fourier transformation on that modified-transform ensemble to generate an ensemble of output-transform signals associated with that elevation angle, each modified-transform signal in a modified-transform ensemble being associated with a different azimuth angle so that radiation received by the antenna array from a radiation source results in a maximum in the output-transform signal associated with the azimuth and elevation angles of the radiation source.

4. An apparatus as defined in claim 3 wherein the first Fourier-transform device is a two-dimensional compressive receiver whose output ports are positioned to correspond to integer spatial frequencies, the two-dimensional compressive receiver simultaneously performing a temporal Fourier transformation so that the input-transform signals are responses to only one temporal-frequency component at a time.

5. An apparatus as defined in claim 4 wherein each processing unit includes means for performing a complex multiplication of the incoming signal by a time-dependent factor equal to the processing factor evaluated at the temporal frequency to which the input-transform output is a response at that time.

6. An apparatus as defined in claim 5 wherein each processing factor is proportional to $$(-j)^n W_n J_n(Bd\cos\theta),$$

where $J_n$ is the nth-order Bessel function of the first kind, B is the wave number at the temporal frequency to which the input-transform output is a response at that time, d is the radius of the circular array, $\theta$ is the elevation angle with which the procesing unit is associated, and $W_n$ is a weighting factor.

7. An apparatus as defined in claim 3 wherein the second Fourier-transform devices include Butler matrices modified to produce integer-spatial-frequency components.

* * * * *